United States Patent
Hayakawa

(10) Patent No.: US 10,313,145 B2
(45) Date of Patent: Jun. 4, 2019

(54) INFORMATION PROCESSING APPARATUS, METHOD OF CONTROLLING THE SAME, AND STORAGE MEDIUM INCLUDING A PRINTING SYSTEM THAT SUPPORTS A SEARCH FUNCTION AND A SEARCH RESULT SCREEN DISPLAY CONFORMING TO A SEARCH RESULT PRINTER FOUND

(71) Applicant: CANON KABUSHIKI KAISHA, Tokyo (JP)

(72) Inventor: Takeshi Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/919,877

(22) Filed: Mar. 13, 2018

(65) Prior Publication Data

US 2018/0278432 A1  Sep. 27, 2018

(30) Foreign Application Priority Data

Mar. 23, 2017  (JP) .................................. 2017-057723

(51) Int. Cl.
| | |
|---|---|
| *G06F 9/00* | (2006.01) |
| *G06F 9/44* | (2018.01) |
| *H04L 29/06* | (2006.01) |
| *H04L 12/28* | (2006.01) |
| *G06F 3/12* | (2006.01) |
| *H04L 12/24* | (2006.01) |
| *G06F 9/4401* | (2018.01) |
| *G06F 9/445* | (2018.01) |

(52) U.S. Cl.
CPC ........ *H04L 12/2809* (2013.01); *G06F 3/1204* (2013.01); *G06F 3/1226* (2013.01); *G06F 3/1288* (2013.01); *G06F 3/1292* (2013.01); *G06F 9/4411* (2013.01); *G06F 9/44526* (2013.01); *H04L 41/0213* (2013.01); *H04L 41/12* (2013.01); *H04L 41/22* (2013.01); *G06F 3/1225* (2013.01); *G06F 3/1228* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 8,611,248 | B2 | 12/2013 | Abe | ............................... 370/252 |
| 2004/0267730 | A1* | 12/2004 | Dumais | ............... G06F 16/9535 |
| 2009/0175200 | A1* | 7/2009 | Abe | ..................... H04L 12/2809 370/254 |
| 2017/0279998 | A1* | 9/2017 | Nakagawa | ......... H04N 1/00204 |

FOREIGN PATENT DOCUMENTS

JP  2009-187533  8/2009

* cited by examiner

*Primary Examiner* — Marcellus J Augustin
(74) *Attorney, Agent, or Firm* — Venable LLP

(57) ABSTRACT

A mobile terminal that executes an operating system (OS) including a printing system that supports a search function using a first search protocol as a standard performs a search using the first search protocol according to a script, performs a search using a second search protocol by a plug-in for the printing system, and displays a search result screen conforming to a search result printer found according to the script, in which a predetermined printer is excluded, and a search result printer found by using the second search protocol, in which the predetermined printer is included.

20 Claims, 19 Drawing Sheets

INFORMATION PROCESSING APPARATUS, METHOD OF CONTROLLING THE SAME, AND STORAGE MEDIUM INCLUDING A PRINTING SYSTEM THAT SUPPORTS A SEARCH FUNCTION AND A SEARCH RESULT SCREEN DISPLAY CONFORMING TO A SEARCH RESULT PRINTER FOUND

BACKGROUND OF THE INVENTION

Field of the Invention

The present invention relates to an information processing apparatus, a method of controlling the same, and a storage medium.

Description of the Related Art

A program called a plug-in is used when performing printing in an information processing apparatus like a smart phone (mobile terminal). A user needs to download and install a plug-in to use a printing plug-in function. However, a user may take time to find an optimal plug-in or may install the wrong plug-in. In the initial state of the mobile terminal, a printing plug-in is not installed on the mobile terminal, and thus the user of the mobile terminal cannot print.

Therefore, in recent mobile terminals, corresponding operating systems (OS) are starting to support printing functions as a standard. A printing function supported by an OS as a standard will be described below together with a printing system.

Japanese Patent Laid-Open Publication No. 2009-187533 discloses an information processing apparatus that displays one peripheral device supporting different protocols as one peripheral device on a display device.

However, a printer may not be compatible with a specific protocol used by a printing system to search for a printer. Furthermore, when a printing plug-in is installed, a printer that is physically the same is detected by both the printing system and a plug-in and is doubly displayed as a print target printer.

SUMMARY OF THE INVENTION

The present invention provides an information processing apparatus capable of preventing the same printer from being doubly displayed in search results when a printer is searched for by using a printing system provided by an operating system (OS) of the information processing apparatus and a print plug-in for the corresponding printing system.

An information processing apparatus according to one embodiment of the present invention is an information processing apparatus that executes an operating system (OS) including a printing system that supports a search function using a first search protocol as a standard, the information processing apparatus comprising: a memory storing instructions; and a processor executing the instructions causing the information processing apparatus to: identify, if a plug-in for the printing system is installed, a vendor that corresponds to the plug-in; perform a search using the first search protocol; perform a display conforming to a search result of one or more printers found by using the first search protocol, in which a printer of the identified vendor is excluded; perform a search using a second search protocol by the plug-in for the printing system; and perform, together with the display, a display conforming to a search result using the second search protocol, which includes the printer of the identified vendor.

Further features of the present invention will become apparent from the following description of exemplary embodiments (with reference to the attached drawings).

DESCRIPTION OF THE EMBODIMENTS

Hereinafter, embodiments for implementing the present invention will be described with reference to the attached drawings and the like.

First Embodiment

Figure 1:
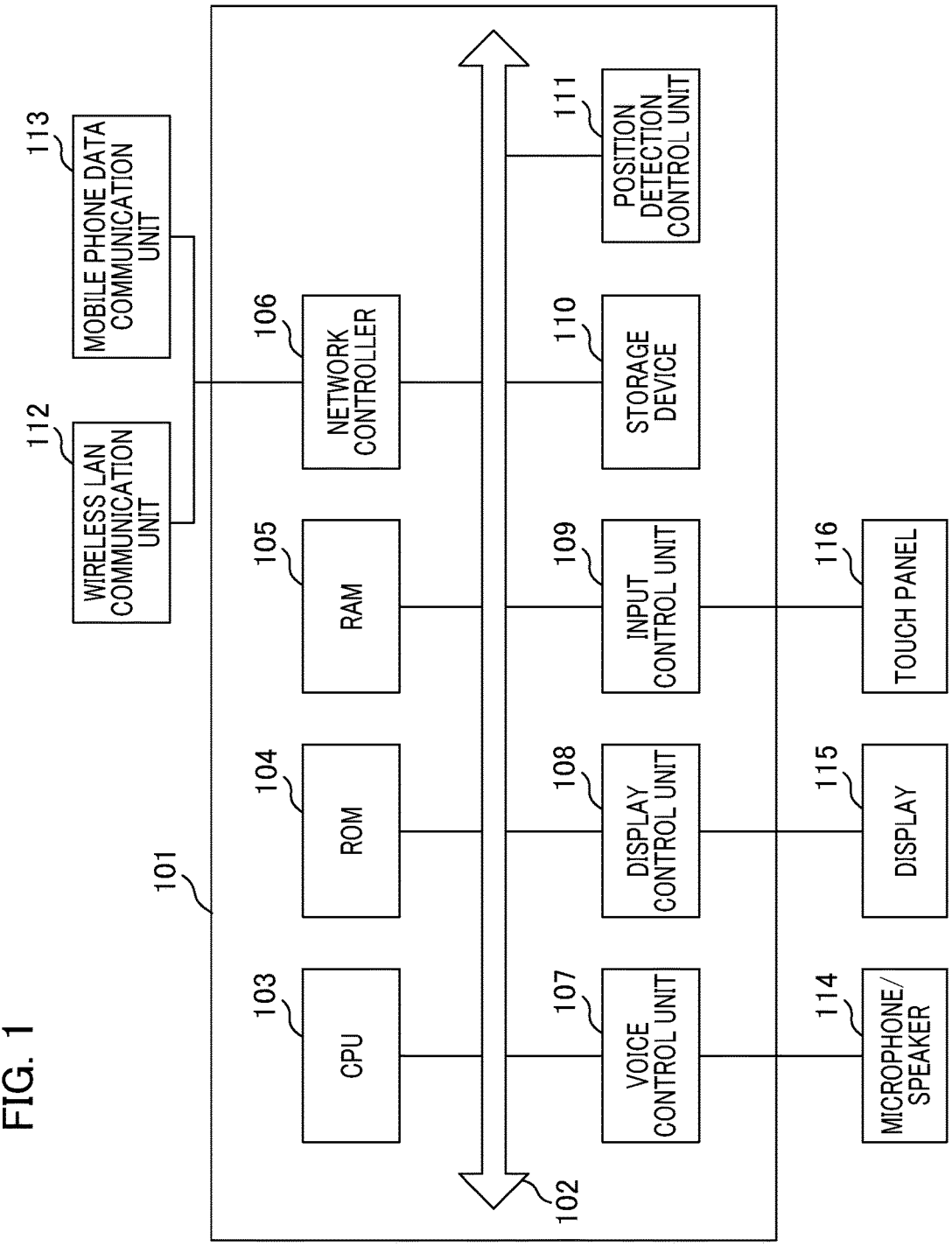
FIG. 1 is a diagram showing an example of hardware configuration of a mobile terminal according to a first embodiment of the present invention.

FIG. 1 is a diagram showing an example of hardware configuration of an information processing apparatus (mobile terminal) according to a first embodiment of the present invention.

Each component of a mobile terminal 101 is connected to a system bus 102. A ROM 104 stores an operating system (OS) and applications for controlling calls and data communication.

By executing such computer programs, a CPU 103 functions as a processing unit that performs respective processes described below. Furthermore, applications for controlling data communication may include mail software and web browsers. A RAM 105 is used as a work memory area when the CPU 103 executes a computer program. The RAM 105 is also used as a memory for temporarily storing web page data acquired by a web browser from a web server, authentication information for accessing a web service, etc.

The storage device 110 is a non-volatile storage device and stores various operation mode settings, an operation log, and the like that need to be retained even after the mobile terminal 101 is restarted. A network controller 106 performs communication control of a wireless LAN communication unit 112 and a mobile phone data communication unit 113 for participating in a wireless communication network provided by a mobile phone carrier. Generally, when a wireless LAN network is available for participation, the network controller 106 gives priority to a wireless LAN connection.

When the mobile terminal 101 is out of a network area of a wireless LAN, the mobile terminal 101 participates in a wireless communication network provided by a mobile phone carrier. A voice control unit 107 is mainly used when a user is making a telephone call by using a phone call application and mediates input and output of voice data between the phone call application and microphone/speaker 114.

A display control unit 108 controls information to be output on a display 115 of the mobile terminal 101. An input control unit 109 controls information as instructed by a user via buttons of the mobile terminal 101 or a touch panel 116. By using the voice control unit 107, the display control unit 108, and the input control unit 109, an application on the mobile terminal 101 provides information about network communication or various information about the mobile terminal 101 to a user.

A position detection control unit 111 acquires position information of the mobile terminal 101 from a GPS sensor and provides the acquired position information to an OS. Control of the components is implemented by the CPU 103 executing a computer program, such as an OS or an application.

Figure 2:
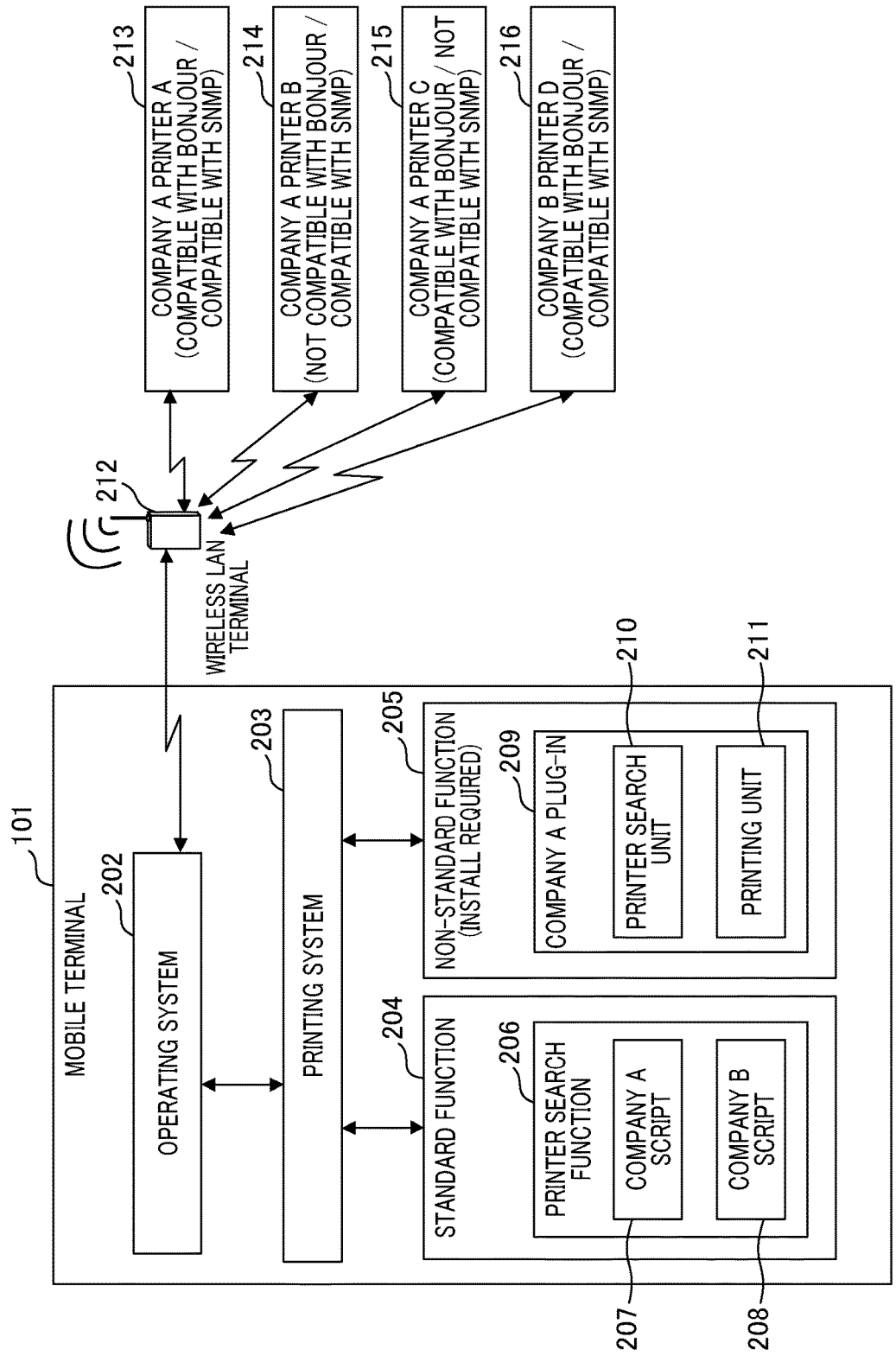
FIG. 2 is a diagram showing an example of a software configuration and a connection relationship of a mobile terminal.

FIG. 2 is a diagram showing a software configuration of the mobile terminal 101 according to the present embodiment and a connection relationship between the mobile terminal 101 and peripheral devices.

In the present embodiment, a printing system 203 is included as one function of an OS 202. Components of software of the printing system 203 are categorized into standard functions 204 and non-standard functions 205.

The printing system 203 has a printer search function 206 and a printing function (not shown) as the standard functions 204. In this regard, since the OS 202 of the mobile terminal 101 has a standard search function and a standard printing function in advance, minimal printing can be performed even when the mobile terminal 101 is in the initial state.

In the present embodiment, Bonjour is used as a first search protocol supported by the printer search function 206 as a standard. Furthermore, the first search protocol is not limited to Bonjour, and any other protocol can be used as long as the corresponding protocol is capable of communicating with printers of printer vendor companies according to common standards.

Functions of the printer search function 206 can be extended via scripts. Scripts are provided by a printer vendor, for example. In the example shown in FIG. 2, the printer search function 206 has a Company A script 207 provided by Company A and a Company B script 208 provided by Company B.

The non-standard function 205 can be used by installing a plug-in application (hereinafter referred to as a plug-in) for the printing system 203. The plug-in is provided by a printer vendor or an application vendor to a user via an application distribution service, such as Google Play (registered trademark).

By installing the plug-in, the user can use a printing function as intended by a printer vendor. In the example shown in FIG. 2, a Company A plug-in 209 provided by Company A is installed on the mobile terminal 101. The Company A plug-in 209 has a printer search unit 210 and a printing unit 211.

The printing system 203 of the mobile terminal 101 communicates with printers 213 to 216 via the OS 202 and a wireless LAN terminal 212. The printing system 203 communicates with the printers 213 to 216 by using the network controller 106 and the wireless LAN communication unit 112 controlled by the OS 202.

The printer search unit 210 uses a predetermined protocol supported by Company A, e.g., a uniquely defined printer management protocol. Furthermore, the printer search unit 210 can also use a common protocol, such as Simple Network Management Protocol (SNMP).

As shown in FIG. 2, protocols compatible with the printers 213 to 216 are different from one another. For example, the printers 213, 215, and 216 are compatible with Bonjour, but the printer 214 is not compatible with Bonjour. Furthermore, although the printers 213, 214, and 216 are compatible with SNMP, the printer 215 is not compatible with Bonjour.

Figure 3:
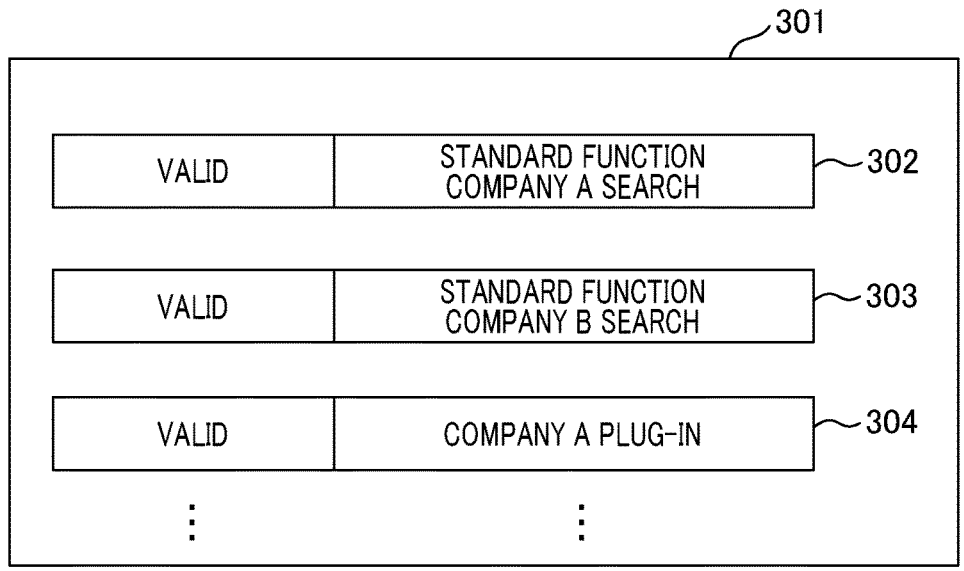
FIG. 3 is a diagram showing an example of data referred to in a search process by a printing system.

FIG. 3 is a diagram showing an example of data referred to by the printing system 203.

Search means flag data 301 is data that is stored in the storage device 110 and can be used by the printing system 203. The printing system 203 can acquire the search means flag data 301 via an interface provided in the OS 202.

The search means flag data 301 is data indicating whether the printer search function 206 and a plug-in of the printing system 203 are valid. As shown in FIG. 2, in addition to the printer search function 206, which is a standard function of the printing system 203, the mobile terminal 101 searches for a printer via the printer search unit 210 of the Company A plug-in 209, which is a non-standard function.

A Company A search flag 302 is a flag indicating whether the printer search function 206 of the printing system 203 searches for a printer of Company A. A Company B search flag 303 is a flag indicating whether the printer search function 206 searches for a printer of Company B. A Company A plug-in flag 304 is a flag indicating whether the printing system 203 uses the Company A plug-in 209.

When the printing system 203 does not use a plug-in, a search function based on a plug-in is not used. A flag included in the search means flag data 301 increases or decreases when a plug-in is installed or uninstalled. In the example shown in FIG. 3, all flags included in the search means flag data 301 are validated, thereby indicating that the printer search function 206 searches for printers of Company A and Company B and uses the Company A plug-in 209.

Figure 4:
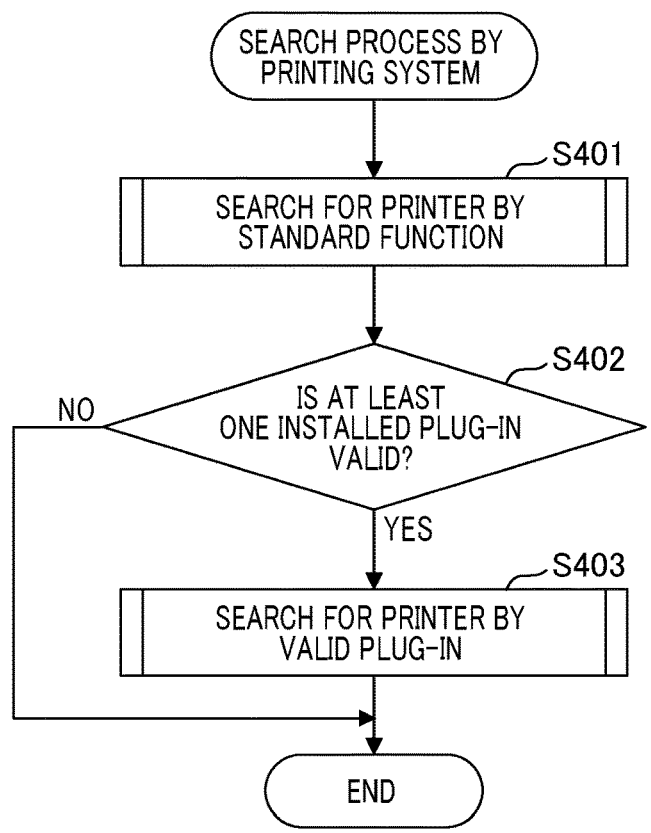
FIG. 4 is a flowchart of a search process performed by a printing system.

FIG. 4 is a flowchart for describing a search process performed by the printing system 203.

In step S401, the printer search function 206, which is a standard function of the printing system 203, performs a searching for a printer. Details of the process of step S401 will be described below with reference to FIG. 5. Furthermore, it is assumed that no special control based on the Company A script 207 or the Company B script 208 is added in the search process performed by the printer search function 206 in step S401.

In step S402, the printer search function 206 refers to the search means flag data 301 and determines whether an installed plug-in is used. In step S402, it is determined whether each installed plug-in is used, and when all the plug-ins are invalidated (not used), the process is terminated.

On the other hand, when any plug-in is validated (used) for the printer search function 206, the process proceeds to step S403. In the example shown in FIG. 3, since the Company A plug-in flag 304 is validated, the process proceeds to step S403. In step S403, printer searching based on the validated plug-in is performed. Here, the printer searching by the Company A plug-in 209 for the printing system 203 is performed. Details of the process of step S403 will be described below with reference to FIG. 6.

Figure 5:
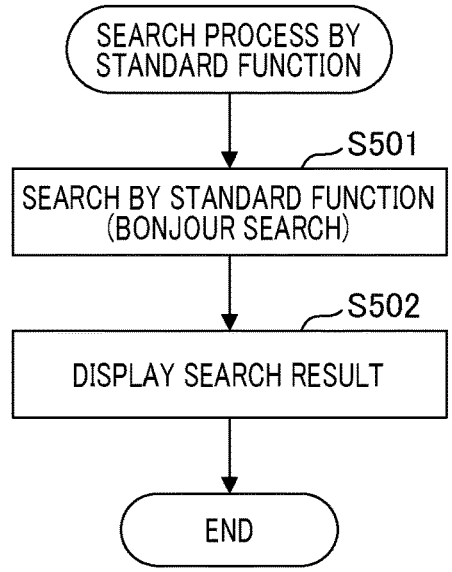
FIG. 5 is a diagram showing a search process by a standard function of a printing system.

FIG. 5 is a flowchart for describing details of a search process by a standard function of the printing system 203.

In step S501, the printer search function 206, which is a standard function of the printing system 203, performs a printer search. Here, a search using Bonjour, which is an example of a search protocol supported by the printing system 203 as a standard, is performed. In step S502, a printer detected in step S501 is displayed as a search result. An example of a screen displayed as a printer search result will be described below with reference to FIG. 7.

Figure 6:
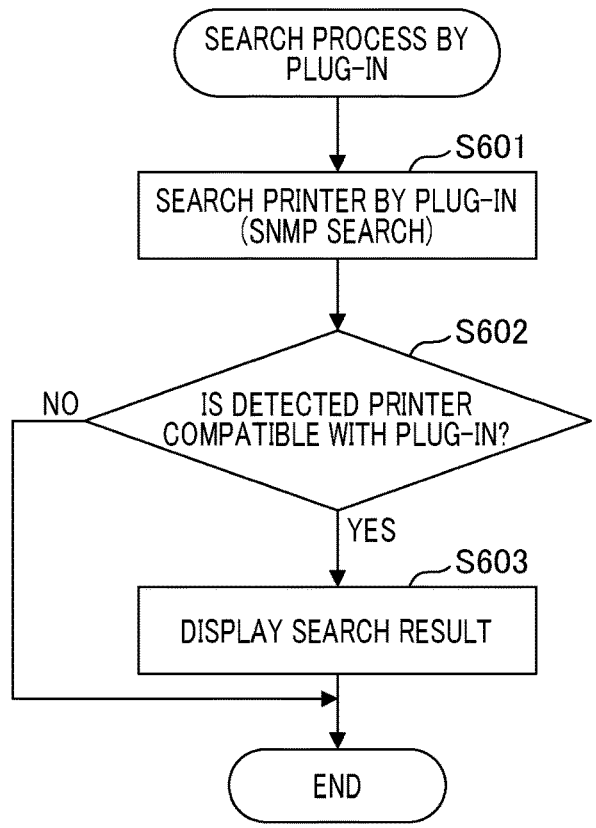
FIG. 6 is a flowchart of a search process by a plug-in for a printing system.

FIG. 6 is a flowchart for describing details of a search process by a plug-in for the printing system 203.

In step S601, the printer search unit 210 of the Company A plug-in 209 performs a printer search using a predetermined protocol supported by the Company A plug-in 209.

In this example, SNMP is used as an example of a predetermined protocol supported by the Company A plug-in 209. However, the predetermined protocol supported by the Company A plug-in 209 is not limited to the SNMP, and other protocols can be used as long as corresponding protocols are capable of communicating with a printer. Furthermore, different protocols can be used for installed plug-ins.

In step S602, the printer search unit 210 determines whether a detected printer is a printer compatible with the Company A plug-in 209 used for searching. In other words, it is determined whether the detected printer is a printer of the vendor that created the Company A plug-in 209. In the present embodiment, the determination of whether the detected printer is a printer compatible with a plug-in is performed based on a vendor name included in a management information base (MIB) of the printer. In detail, when it is determined that a vendor name included in the MIB is the name of a vendor who created a plug-in used for a search, it is determined that a printer detected by the search is a printer compatible with the plug-in used for the search.

In step S603, among printers detected in step S601, a printer determined as a printer compatible with the plug-in used for the search is displayed as a printer search result. An example of a screen displayed as a printer search result will be described below with reference to FIG. 7.

Figure 7:
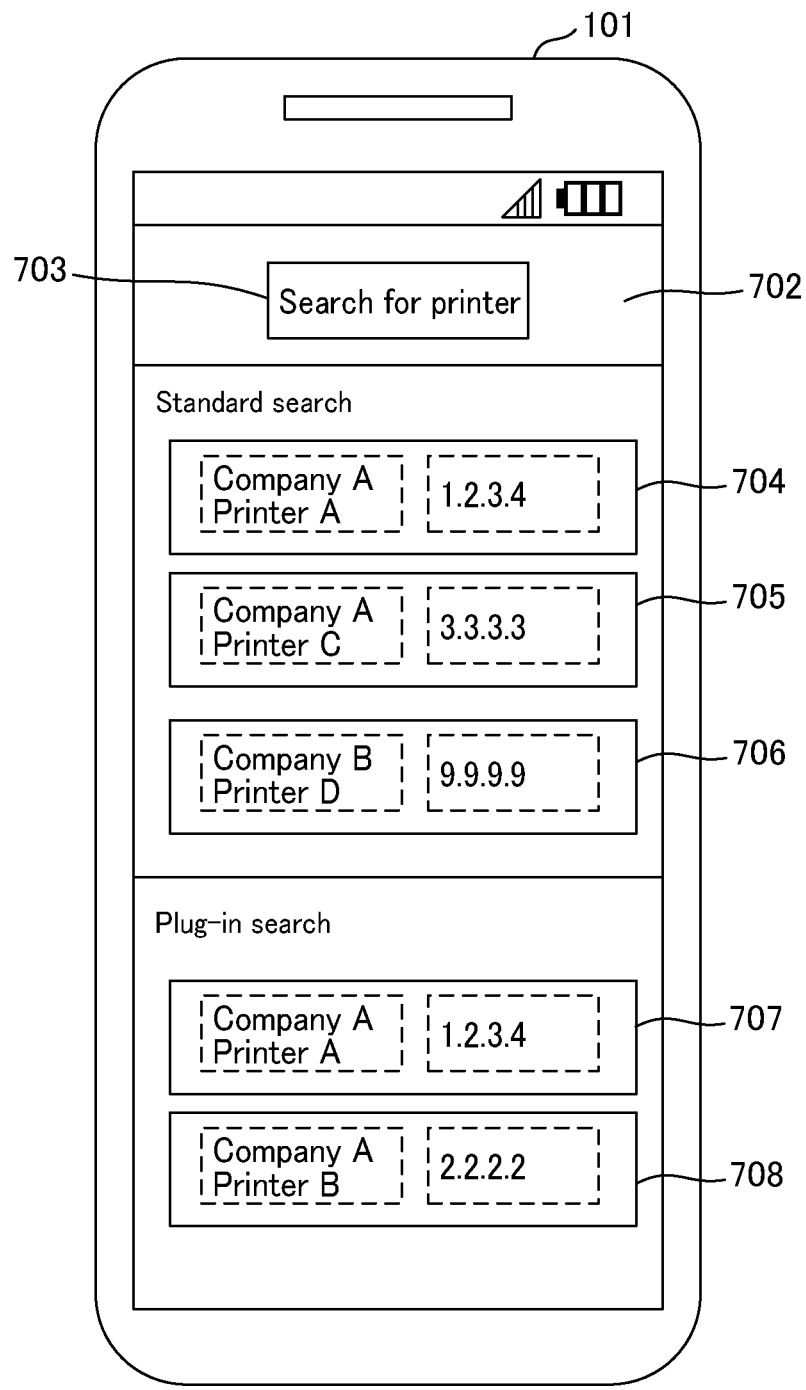
FIG. 7 is a diagram showing an example of a screen displaying a result of a search process by a printing system.

FIG. 7 is a diagram showing an example of a screen displaying a result of a search process (FIG. 4) performed by the printing system 203 of the mobile terminal 101.

In a search screen 702, a printer search button 703 and a result of a printer search are displayed. The printer search button 703 is a button for instructing the printing system 203 to perform a search process (FIG. 4).

Figure 21:
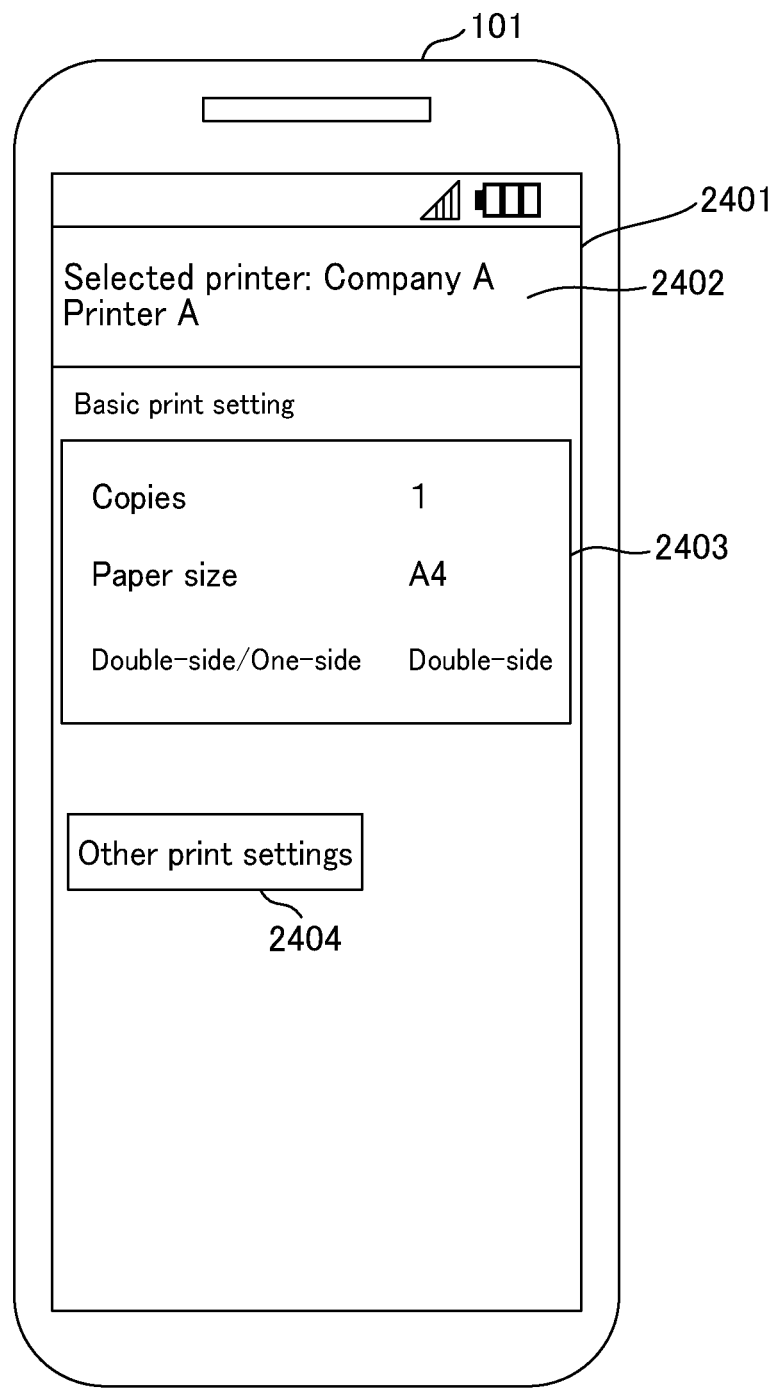
FIG. 21 is a diagram showing an example of a screen for performing print settings of a mobile terminal.

In the example shown in FIG. 7, the printer search button 703 is pressed down, and search result printers 704 to 708 are displayed as a result of the search process (FIG. 4). When a printer is selected from the displayed search result printers 704 to 708, a print setting screen as shown in FIG. 21 is displayed. The search result printers 704 to 706 are printers detected in the process of step S401, that is, a search process by a standard function.

The search result printer 704 shows a result of detecting the printer 213 shown in FIG. 2. Likewise, the search result printer 705 shows a result of detecting the printer 215, and the search result printer 706 shows a result of detecting the printer 216. It may be seen that, since the printer 214 is not compatible with Bonjour, the printer 214 is not detected in a search by a standard function.

On the other hand, the search result printers 707 and 708 are printers detected in the process of step S403, that is, a search process by a printing plug-in, which is a non-standard function of the printing system 203. The search result printer 707 shows a result of detecting the printer 213 shown in FIG. 2. The search result printer 708 shows a result of detecting the printer 214 shown in FIG. 2. Although the printer 214 is not detected in a search by the standard function, the printer 214 is compatible with SNMP, which is a protocol supported by a printing plug-in, and thus it may be seen that the printer 214 is detected in a search by a plug-in, which is an extended function.

As described above, the same printer 213 is doubly displayed as the search result printer 704 and the search result printer 707 in a search result displayed by the printing system 203 due to different protocols used for the search. Therefore, in the present embodiment, the following process, which is an extension of a search process by a standard function (FIG. 5), is performed.

Figure 8:
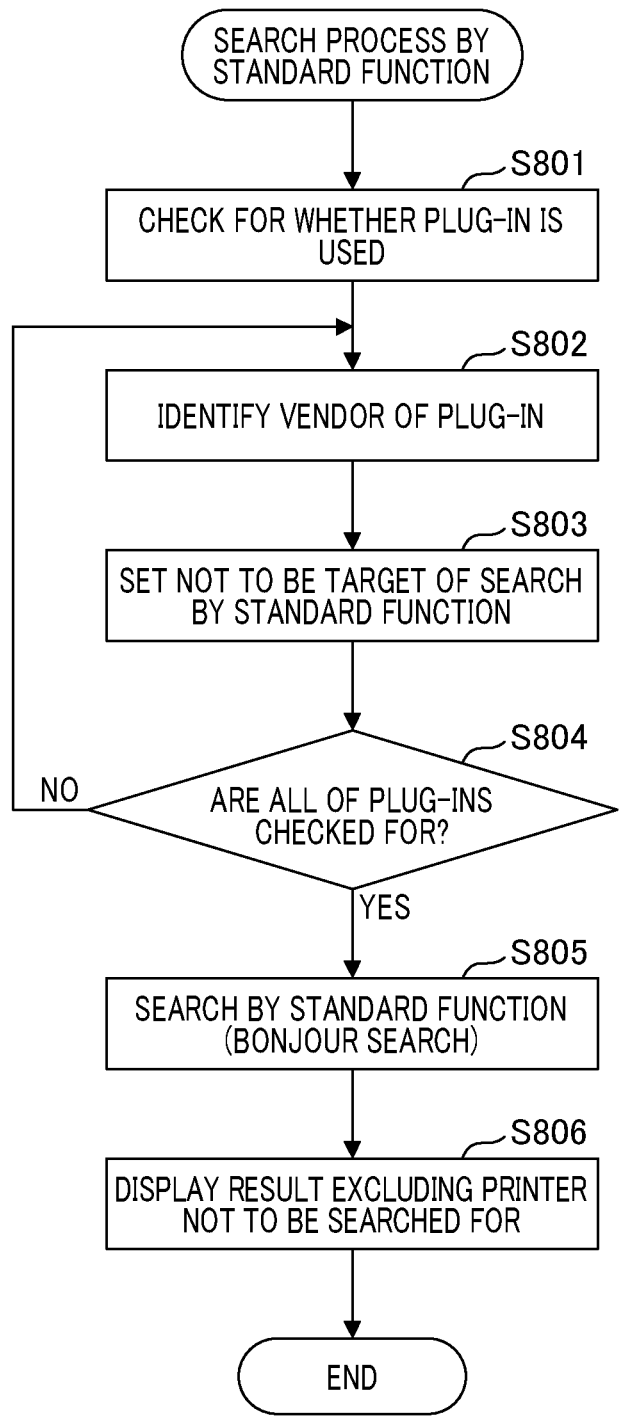
FIG. 8 is a flowchart of a search process by a standard function of a printing system.

FIG. 8 is a flowchart for describing a search process by a standard function of the printing system 203 in detail.

In detail, FIG. 8 is a diagram showing the details of the process of step S401 of FIG. 4, and the process is performed instead of the process described above with reference to FIG. 5.

In step S801, the printer search function 206 of the printing system 203 refers to the search means flag data 301 (FIG. 3) and checks for whether a plug-in is used. In the example shown in FIG. 2, the presence or absence of the Company A plug-in 209 installed as a plug-in for implementing the non-standard function 205 is checked for. In step S802, the printer search function 206 identifies a vendor that created the Company A plug-in 209. In order to identify the vendor, data that includes a list of plug-ins installed on the mobile terminal 101 is used.

Figure 9:
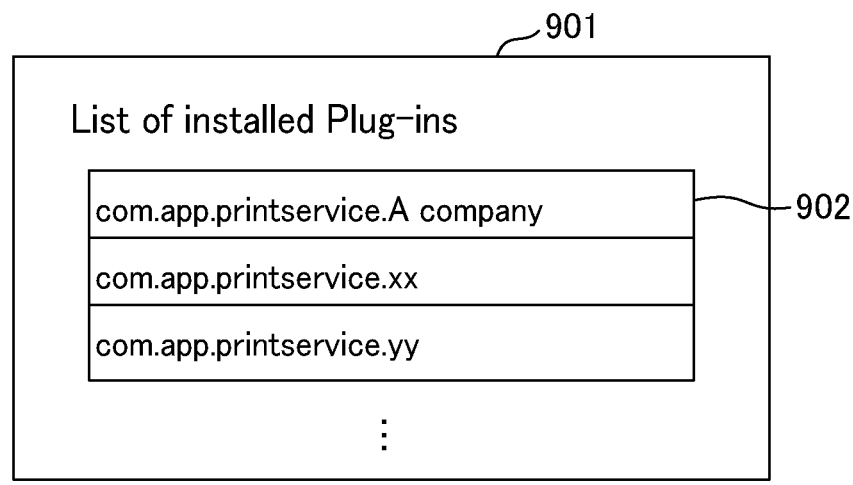
FIG. 9 is a diagram showing an example of data that includes a list of installed plug-ins.

FIG. 9 is a diagram showing an example of data that includes a list of plug-ins installed on the mobile terminal 101.

Plug-in list data 901 is data that is stored in the storage device 110 and can be used by the printing system 203. The printing system 203 can acquire the plug-in list data 901 via an interface provided in the OS 202.

In the present embodiment, a list of package names of installed plug-ins is used as an example of the plug-in list data 901. The package name of a plug-in is a unique value of the plug-in, and a vendor who created the plug-in can be identified with the package name. A plug-in package name 902 is the package name of the Company A plug-in 209, and the printer search function 206 can be determined based on this value that the Company A plug-in 209 is installed.

Returning to the description of FIG. 8, in step S803, printers of the vendor identified in step S802 are set to be excluded from a search process by a standard function. In detail, in the search means flag data 301 (FIG. 3), the printer search function 206 invalidates printers of the vendor identified in step S802 (not to be searched for).

In this case, the Company A search flag 302 is invalidated. When the search means flag data 301 cannot be changed, printers of the vendor identified in step S802 are set not to be displayed as a search result by the standard function after the search. Likewise, when the printer search function 206 cannot exclude printers of a specific vendor from printers to be searched for before the printer search function 206 performs a search, printers of the vendor identified in step S802 are set not to be displayed as a search result by the standard function after the search.

Figure 10:
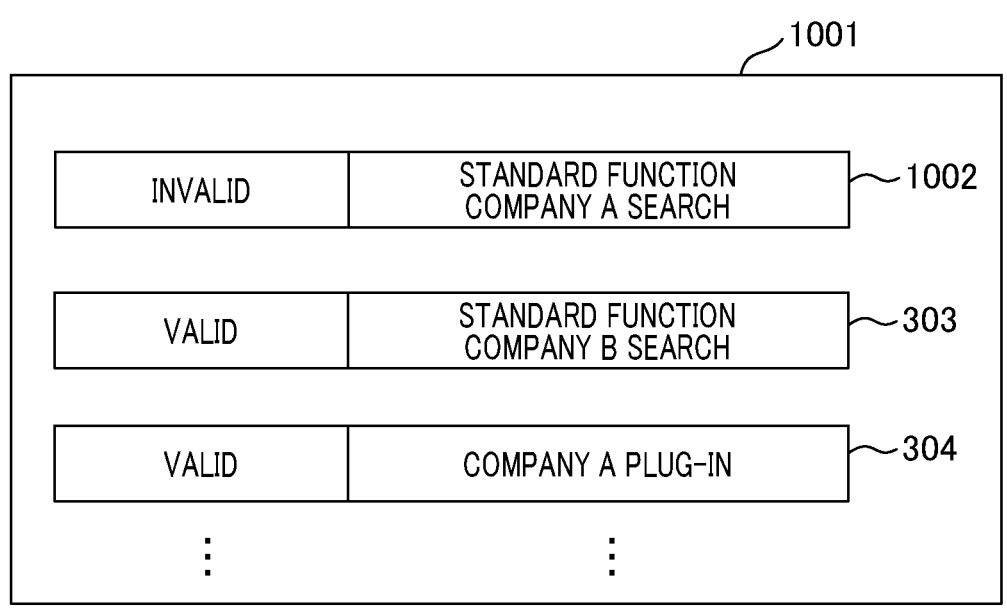
FIG. 10 is a diagram showing an example of data referred to in a search process by a printing system.

FIG. 10 is a diagram showing search means flag data changed by the process of step S803.

In detail, although the Company A search flag 302 is validated in the search means flag data 301 of FIG. 3, the Company A search flag 302 is changed to a Company A search flag 1002, which is invalidated, by the process of step S803. As a result, in step S806 of FIG. 8, a search result excluding printers of Company A is displayed.

Returning to the description of FIG. 8, in step S804, it is determined whether the processes in steps S802 and 803 have been performed for all of the plug-ins installed on the mobile terminal 101. When the processes in steps S802 and 803 are completed for all of the plug-ins, the process proceeds to step S805. When the processes in steps S802 and 803 have not been completed for all of the plug-ins, the process returns to step S802.

Since the process in step S805 is similar to the process in step S501 of FIG. 5, the description thereof will be omitted. Furthermore, in step S805, it is assumed that special controls by the Company A script 207 and the Company B script 208 are not added to the search process performed by the printer search function 206, as in step S501 of FIG. 5.

In step S806, the printer search function 206 displays a printer detected in step S805 as a search result. As described in the process of step S803, when the printer search function 206 cannot exclude printers of a specific vendor from search targets before performing a search, the printer search function 206 performs the following. In other words, the printer search function 206 does not display printers of a vendor identified in step S802 as a search result after the search.

Figure 11:
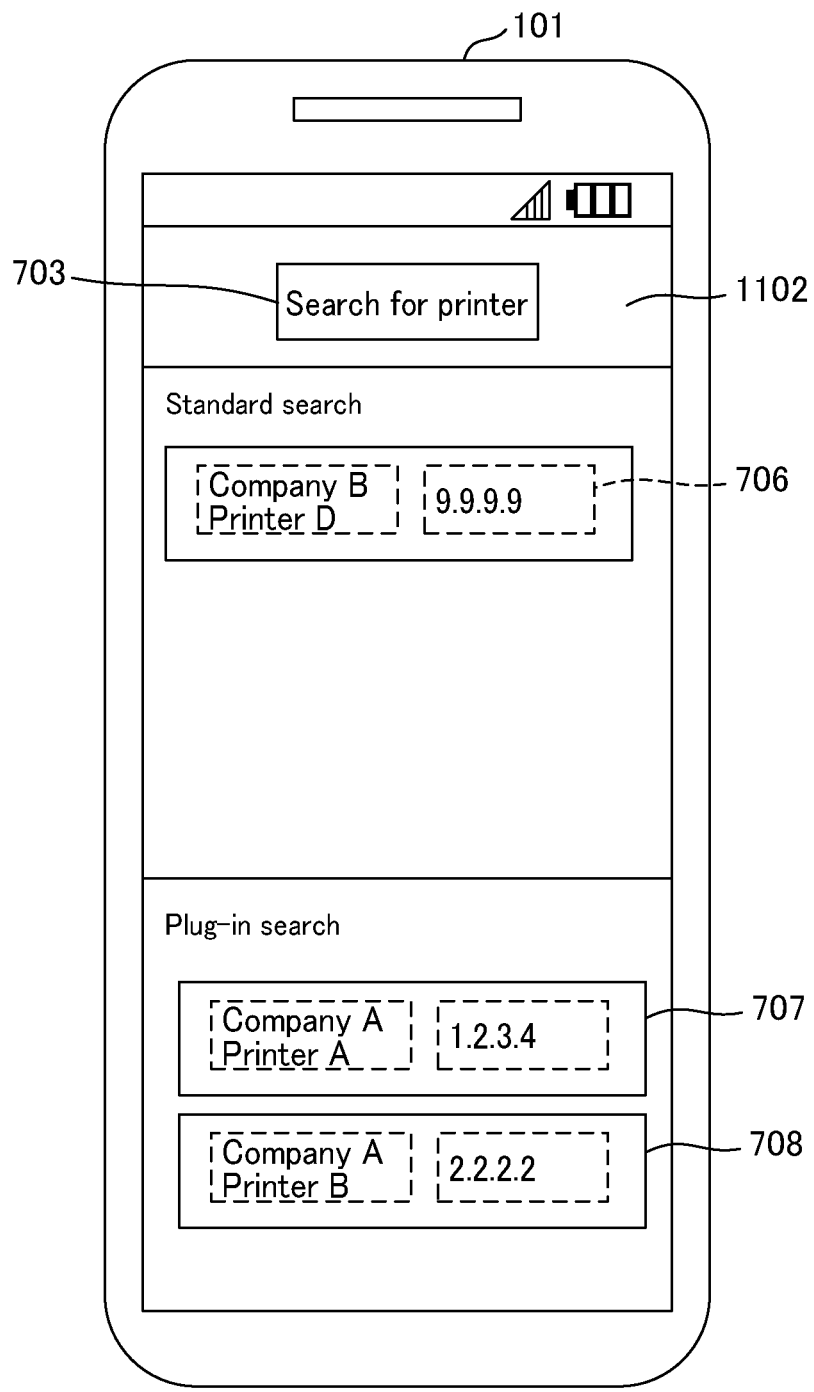
FIG. 11 is a diagram showing an example of a screen displaying a result of a search process by a printing system.

FIG. 11 is a diagram showing an example of a screen displaying a result of the search process (FIG. 4) performed by the printing system 203 of the mobile terminal 101.

In detail, a search screen 1102 is a screen displayed when the process shown in FIG. 8 is performed instead of the process shown in FIG. 5 in the search process (step S401) by the standard function of the search process (FIG. 4). Here, the same reference numerals in step S401 are given to the same components of the search screen 702 (FIG. 7) displayed when the process shown in FIG. 5 is performed, and description thereof will be omitted.

The search screen 1102 is different from the search screen 702 of FIG. 7 in that the search result printers 704 and 705 are not displayed on the search screen 1102. In other words, the printer that is detected both in the search process by the standard function and the search process by the plug-in and doubly displayed in the search screen 702 (FIG. 7) is only displayed as a result of a search process by a plug-in on the search screen 1102 (FIG. 11). This is because, according to the process of step S803 of FIG. 8, in a printer searching by the standard function, printers of a vendor who created the plug-in are neither searched for nor displayed as a search result.

As described above, according to the present embodiment, when a printer is searched for using a printing system provided in the OS of an information processing apparatus and a plug-in for the corresponding printing system 203, it is possible to prevent the same printer from being doubly displayed as a search result.

Second Embodiment

In the first embodiment, a search process by a standard function of the printing system 203 is extended such that a printer detected in a search process by an installed plug-in is not detected in a search process by the standard function of the printing system 203.

On the other hand, in the present embodiment, by preparing scripts prepared by respective vendors, the same effect is acquired. Furthermore, the same components as those of the first embodiment are denoted by the same reference numerals, and descriptions thereof are omitted. A process performed in the present embodiment is implemented by loading a program stored in the ROM 104 into the RAM 105 and executing the program by the CPU 103.

Figure 12:
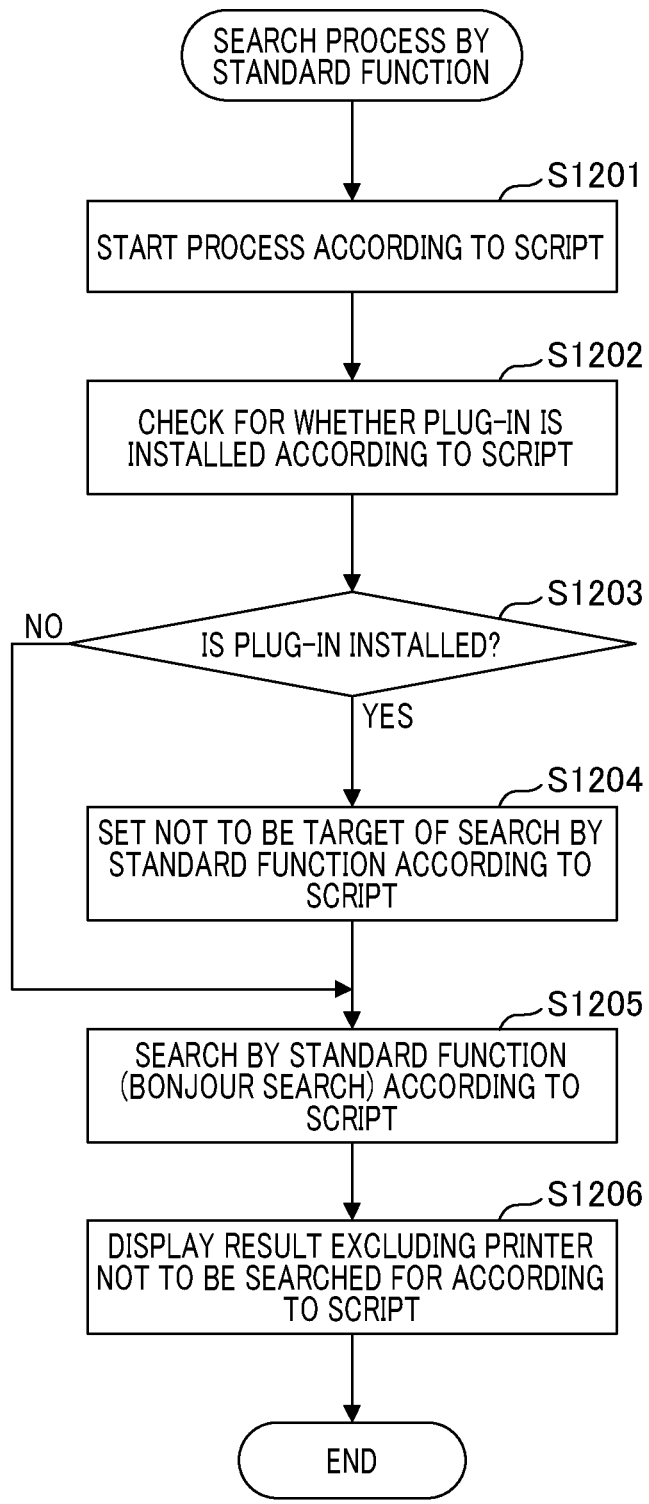
FIG. 12 is a diagram showing a search process by a standard function of a printing system.

FIG. 12 is a flowchart for describing details of a search process by the standard function of the printing system 203 according to the present embodiment.

In detail, FIG. 12 is a diagram showing the details of the process of step S401 of FIG. 4, and the process is performed instead of the process described above with reference to FIG. 5 or FIG. 8.

In step S1201, the printer search function 206 of the printing system 203 starts a process according to scripts. The scripts are provided by printer vendors and implement function extensions of the printer search function 206. In the example shown in FIG. 2, the scripts are the Company A script 207 and the Company B script 208. Hereinafter, it is assumed that the process of the Company A script 207 is started, but the same process is performed for all scripts included in the printer search function 206.

In step S1202, the printer search function 206 checks for whether a plug-in compatible with the Company A script 207 is installed, according to the Company A script 207. In other words, whether a plug-in of the vendor who created the Company A script 207 is installed is checked.

In step S1203, the printer search function 206 determines whether a plug-in compatible with the Company A script 207 is installed based on the presence or absence of the installation checked for in step S1202, according to the Company A script 207. In detail, the printer search function 206 refers to the search means flag data 301 (FIG. 3) to check for whether a plug-in is used, and when the plug-in is validated (to be used), it is determined that a plug-in compatible with the Company A script 207 is installed.

When it is determined that a plug-in is installed, the process proceeds to step S1204. When it is determined that the plug-in is not installed, the process proceeds to step S1205. In the example shown in FIG. 3, since the Company A plug-in flag 304 is validated, it is determined that a plug-in compatible with the Company A script 207 is installed, and the process proceeds to step S1204.

In step S1204, the printer search function 206 sets printers of a vendor compatible with the Company A script 207 to be excluded from a search process by the standard function according to the Company A script 207. In detail, in the search means flag data 301 (FIG. 3), the printer search function 206 invalidates (not to be searched for) a printer of the vendor who provided the plug-in determined as an installed plug-in in step S1203.

In other words, the Company A search flag 302 is invalidated. By the process of step S1204, the search means flag data is changed as shown in FIG. 10, as in the first embodiment.

When the search means flag data 301 cannot be changed, printers of the vendor that are set not to be searched for in step S1204 are set not to be displayed as a search result by the standard function after the search. Likewise, when printers of a specific vendor cannot be excluded from a search before the search is performed, printers of the vendor that are set not to be searched for in step S1204 are set not to be displayed as a search result by the standard function after a search.

In step S1205, the printer search function 206 performs a printer search according to the Company A script 207. Here, a search using Bonjour employed as an example of a search protocol supported by the printing system 203 as a standard is performed. In step S1206, the printer search function 206 displays a printer detected in step S1205 as a search result according to the Company A script 207.

As described in the process of step S1204, when the printer search function 206 cannot exclude printers of a specific vendor from search targets before performing a search, the printer search function 206 performs the following. In other words, after the search, the printer search function 206 does not display printers of a vendor not to be searched for in step S1204 as a search result by the standard function.

In the present embodiment, a screen displayed according to a result of the search process (FIG. 4) performed by the printing system 203 is identical to the search screen 1102 shown in FIG. 11 according to the first embodiment. In the present embodiment, in the search process (step S401) by the standard function of the search process (FIG. 4), the process shown in FIG. 12 is performed instead of the process shown in FIG. 8, but a screen displayed according to a result of the search process shown in FIG. 12 is identical to that displayed according to a result of the search process shown in FIG. 8.

In other words, the printer that is doubly displayed as results of both the search process by the standard function and the search process by the plug-in in the search screen 702 (FIG. 7) is displayed only as a result of the search process by the plug-in in the search screen 1102 (FIG. 11). This is because, according to the process of step S1204 of FIG. 12, in a printer searching by the standard function, printers of a vendor who created the plug-in are neither searched for nor displayed as a search result.

Figure 13:
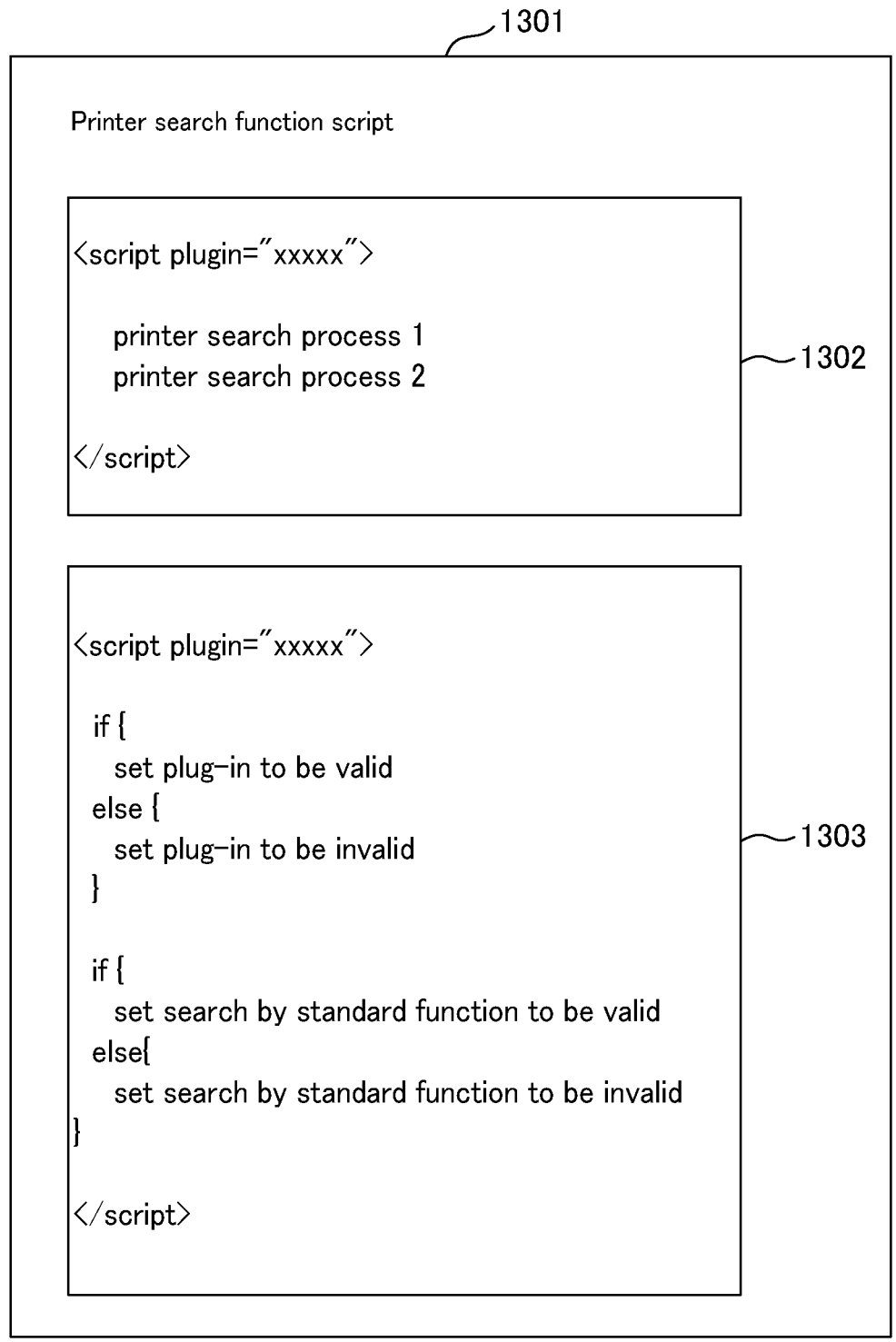
FIG. 13 is a diagram showing an example of a script extending a standard function of a printing system.

FIG. 13 is a diagram showing an example of a script performed by the printer search function 206 of the printing system 203 in FIG. 12.

In the present embodiment, it is assumed that a script is created using a common script language. However, the programming language is not limited to script languages, and any means can be used as long as it operates as intended by a vendor.

A script 1301 is an example of the Company A script 207 according to present embodiment. The script 1301 includes a printer search processing unit 1302 and a system control unit 1303. According to the printer search processing unit 1302 of the script 1301, the printer search function 206 can perform a printer search of the vendor that created the script 1301, that is, Company A.

Furthermore, although not shown, the processes of steps S1202 to S1206 in FIG. 12 can be performed according to the script 1301. Furthermore, a plurality of search processes can be defined in the printer search processing unit 1302. For example, a search process using a protocol other than Bonjour can be provided.

Furthermore, the printer search function 206 can manipulate the setting of the printing system. 203 according to the system control unit 1303 of the script 1301. The system control unit 1303 can switch whether or not to enable a plug-in compatible with the script 1301 and can instruct switching of whether or not to search for a printer of the vendor compatible with the script 1301 by the standard function. For example, the settings of the search means flag data 301 shown in FIG. 3 can be switched.

As described above, according to the present embodiment, when a printer is searched for using a printing system provided in the OS of an information processing apparatus and a plug-in for the corresponding printing system 203, it is possible to prevent a same printer from being doubly displayed as a search result.

Third Embodiment

In the first and second embodiments, a printer detected in a search process by an installed plug-in is not detected in a search process by the standard function of the printing system 203. On the contrary, the present embodiment prevents a same printer from being redundantly displayed by invalidating a plug-in when a printer detected in a search process by the plug-in is detected in a search process by the standard function of the printing system 203.

The same components as those of the first embodiment or the second embodiment are denoted by the same reference numerals, and descriptions thereof are omitted. A process performed in present embodiment is implemented by loading a program stored in the ROM 104 into the RAM 105 and executing the program by the CPU 103.

Figure 14:
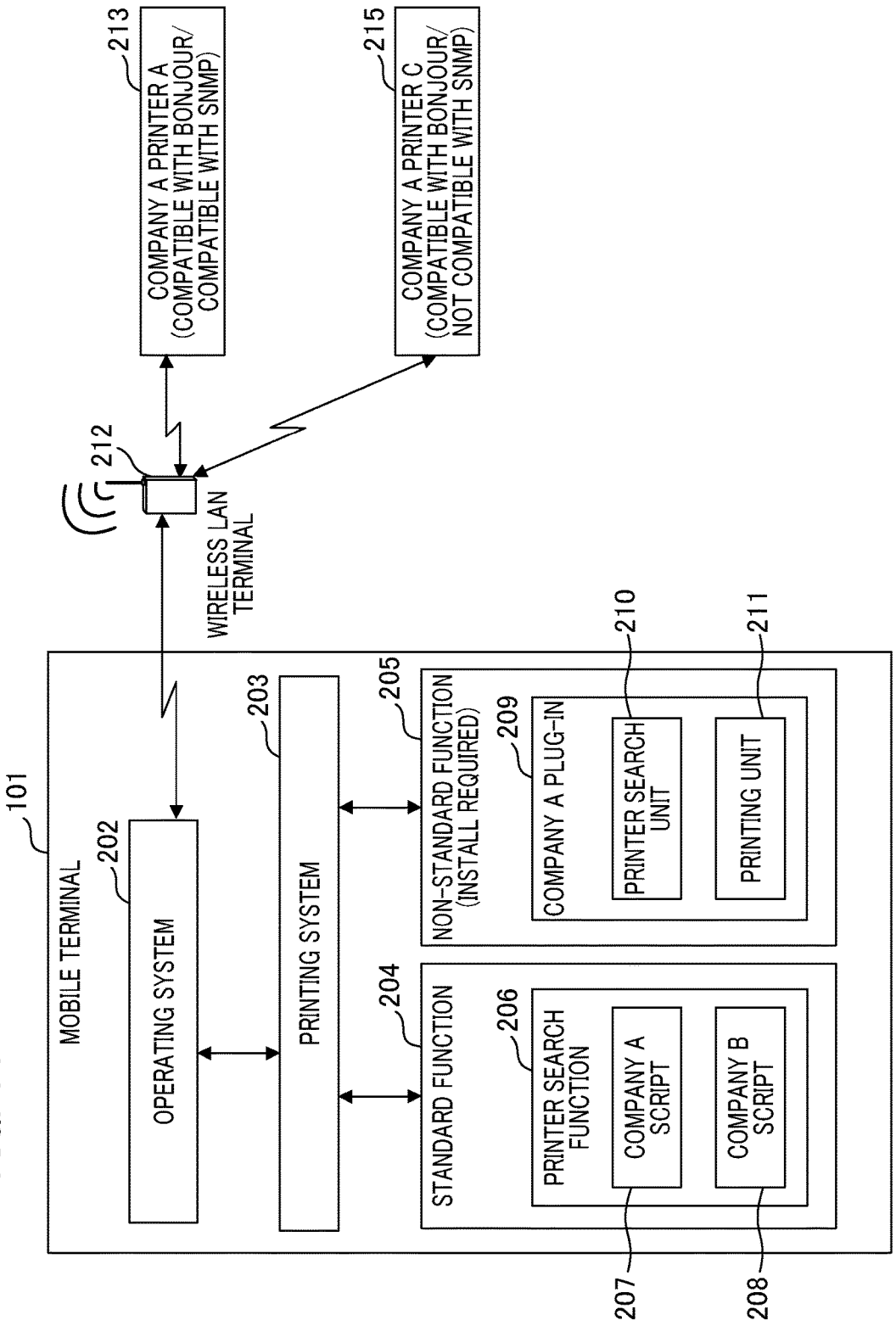
FIG. 14 is a diagram showing an example of a software configuration and connection relationships of a mobile terminal.

FIG. 14 is a diagram showing software configuration of the mobile terminal 101 according to present embodiment and connection relationships between the mobile terminal 101 and peripheral devices.

The configuration of the mobile terminal 101 itself according to the present embodiment is identical to that of the mobile terminal 101 according to the first embodiment. Therefore, in the following description, the same reference numerals are given to the same components as in the first embodiment, and the description thereof will be omitted.

As in the first embodiment, in the present embodiment, the Bonjour is used as a first search protocol supported by the printer search function 206 as a standard. However, the first search protocol is not limited to the Bonjour and any other protocol can be used as long as it is a protocol capable of communicating with printers of printer vendor companies according to common standards.

Furthermore, the printer search unit 210 uses a predetermined protocol supported by the Company A, e.g., a uniquely defined printer management protocol. Furthermore, the printer search unit 210 can also use a common protocol, such as the SNMP (Simple Network Management Protocol).

The printing system 203 of the mobile terminal 101 communicates with the printers 213 and 215 via the OS 202 and the wireless LAN terminal 212. The connection relationship between the mobile terminal and the peripheral devices shown in FIG. 14 is different from the connection relationship shown in FIG. 2 in the following points. In the present embodiment, the mobile terminal 101 is different from the mobile terminal 101 in that the mobile terminal 101 according to the present embodiment can communicate only with the printer 213 and the printer 215.

The printer 213 is a printer of the Company A and is compatible with the Bonjour and the SNMP. The printer 215 is the printer of the Company A and is compatible with the Bonjour. However, the printer 215 is not compatible with SNMP. In other words, in the present embodiment, it is assumed that printers to which the mobile terminal 101 can be connected are compatible with the Bonjour.

Figure 15:
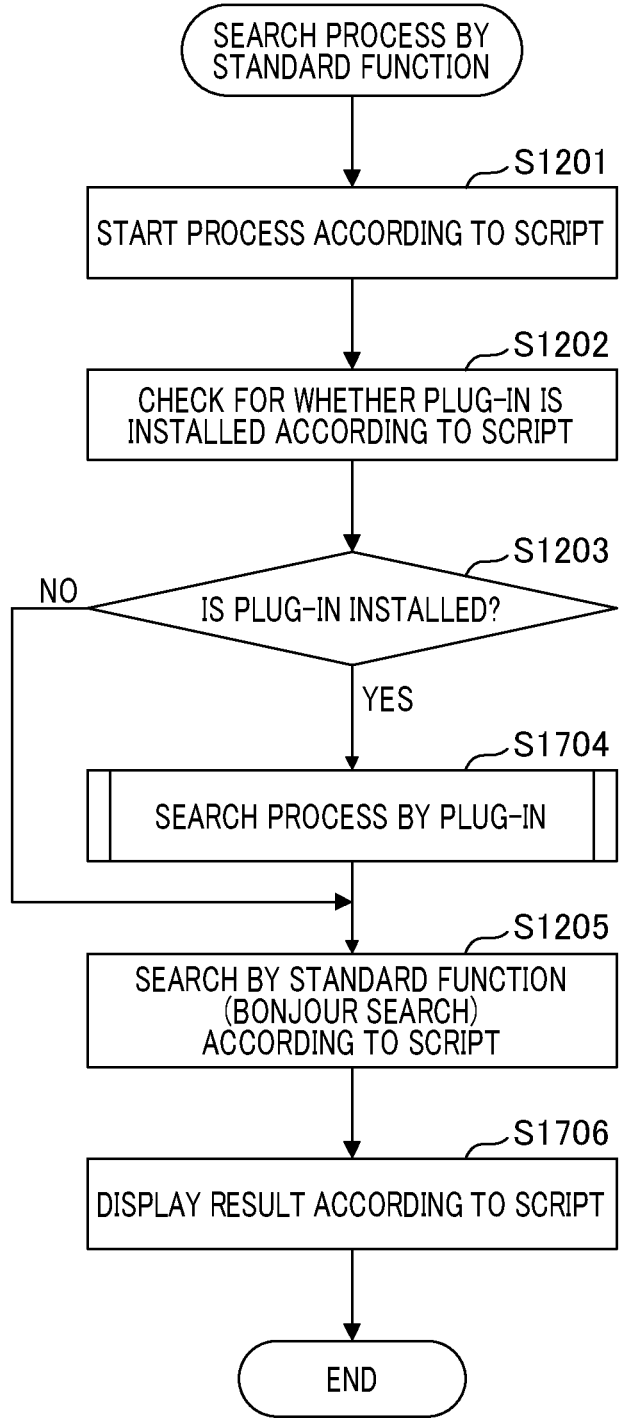
FIG. 15 is a diagram showing a search process by a standard function of a printing system.

FIG. 15 is a flowchart for describing details of a search process by the standard function of the printing system 203 according to present embodiment.

In detail, FIG. 15 is a diagram showing the details of the process of step S401 of FIG. 4, and the process is performed instead of the process described above with reference to FIG. 5, FIG. 8, or FIG. 12.

In FIG. 15, the same steps as those in FIG. 12 are denoted by the same reference numerals, and descriptions thereof are omitted. The difference from FIG. 12 is that step S1704 is performed instead of step S1204. In step S1704, the printer search function 206 instructs the Company A plug-in 209 to perform a search process according to the Company A script 207. Details of the process of step S1704 will be described below with reference to FIG. 17.

Figure 16:
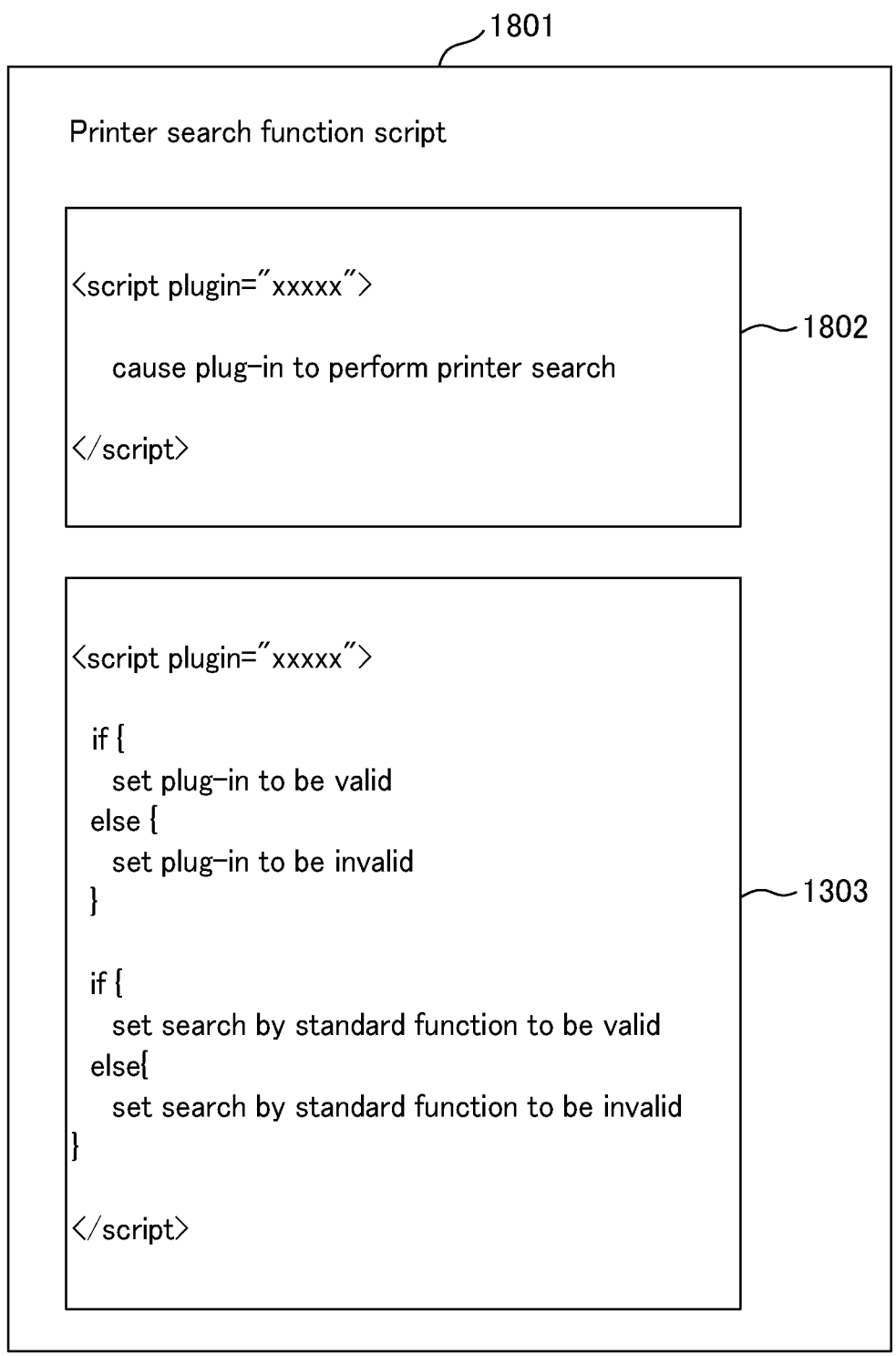
FIG. 16 is a diagram showing an example of a script extending a standard function of a printing system.

FIG. 16 is a diagram showing an example of a script performed by the printer search function 206 of the printing system 203 in FIG. 15.

In the present embodiment, it is assumed that a script is created by using a common script language. However, not limited to script languages, any means can be used as long as it is a programming language operating as intended by a vendor.

A script 1801 is an example of the Company A script 207 according to present embodiment. The script 1801 includes a printer search processing unit 1802 and the system control unit 1303. According to the script 1801, the printer search function 206 can instruct the Company A plug-in 209 to perform a search process. The process of step S1704 in FIG. 15 is performed according to the printer search processing unit 1802 of the script 1801.

Figure 17:
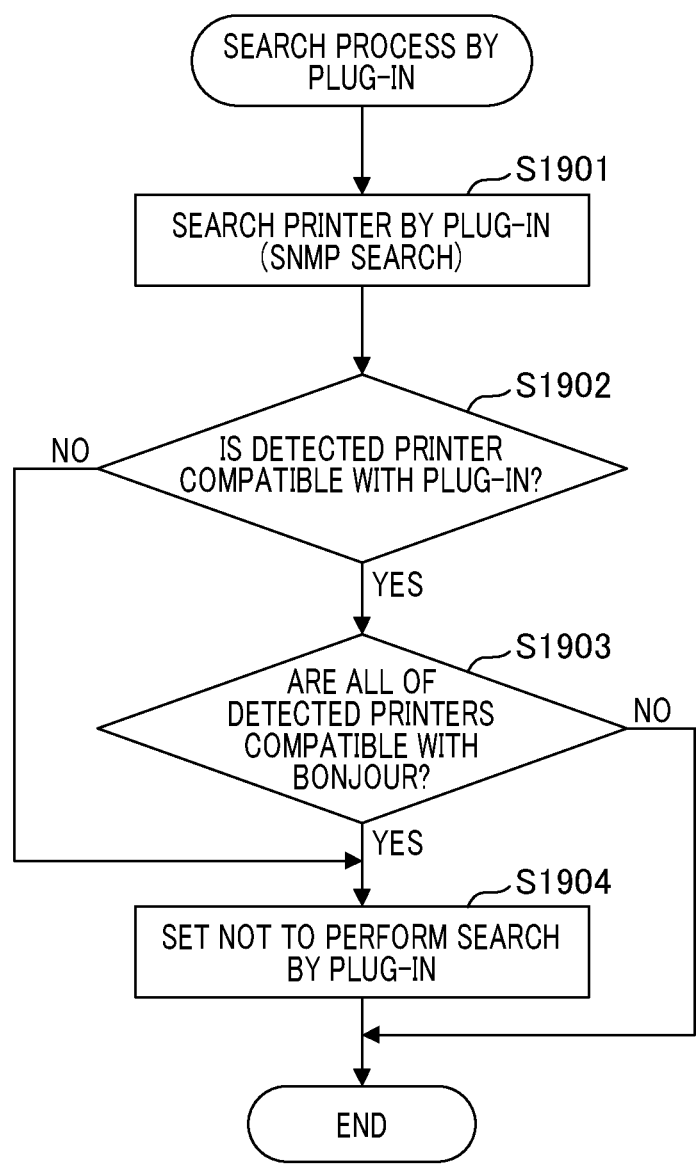
FIG. 17 is a diagram showing a search process by a plug-in for a printing system.

FIG. 17 is a flowchart for describing the details of a process performed in step S1704 of FIG. 15.

In step S1901, the printer search unit 210 included in the Company A plug-in 209 performs a printer searching by using a predetermined protocol supported by the Company A plug-in 209.

In this example, the SNMP is used as an example of predetermined protocols supported by the Company A plug-in 209. However, the predetermined protocols supported by the Company A plug-in 209 are not limited to the SNMP, and other protocols can be used as long as corresponding protocols are capable of communicating with a printer. Furthermore, different protocols can be used for installed plug-ins, respectively.

In step S1902, the printer search unit 210 determines whether a printer detected in step S1901 is a printer compatible with the Company A plug-in 209 used for searching. In other words, whether the printer detected in step S1901 is a printer of the vendor that has created the Company A plug-in 209 is determined. Since the determination process performed in step S1902 is identical to step S602 of FIG. 6, description thereof will be omitted.

In step S1903, the printer search unit 210 determines whether all of printers detected in step S1901 are printers compatible with the Bonjour. When all the detected printers are compatible with Bonjour, the process proceeds to step S1904. When there is even one printer not compatible with the Bonjour, the process of FIG. 17 is terminated.

In the present embodiment, it is determined in step S1903 whether printers are compatible with the Bonjour. However, the reason thereof is that the Bonjour is used as the first search protocol supported by the printer search function 206 of the printing system 203 as a standard. In other words, in step S1903, whether printers are compatible with a protocol identical to the first search protocol supported by the printer search function 206 of the printing system 203 as a standard is determined.

Meanwhile, in a printer search using the SNMP, responses from respective printers are performed asynchronously. Therefore, the processes of steps S1902 and S1903 can be performed appropriately every time there is a response from a printer. In this case, when the process has proceeded to step S1904 even once, the process can be terminated.

In step S1904, the printer search unit 210 invalidates its own plug-in, that is, the Company A plug-in 209 according to the system control unit 1303 of the script 1801. In other words, it is set not to perform a search process by the Company A plug-in 209. In detail, in the search means flag data 301 (FIG. 3), the printer search unit 210 invalidates its own plug-in (not to be used).

In this case, the Company A plug-in flag 304 is invalidated. In other words, in FIG. 17, it is assumed that, in the search process (FIG. 4) by the printing system 203, all of printers detected in a search process a plug-in are detected in a search process by the standard function (step S401). In this case, since the search process by the plug-in (step S403) is unnecessary, the plug-in is invalidated in step S1904 to prevent the search process by the plug-in from being performed.

Furthermore, when the Company A plug-in flag 304 is not invalidated, in the search process (step S403) by the plug-in, in the search process (FIG. 4) by the printing system 203, re-search (step S601) of a printer using the SNMP is performed. Alternatively, a result of printer detection in step S1901 can be used instead of performing the re-search.

Figure 18:
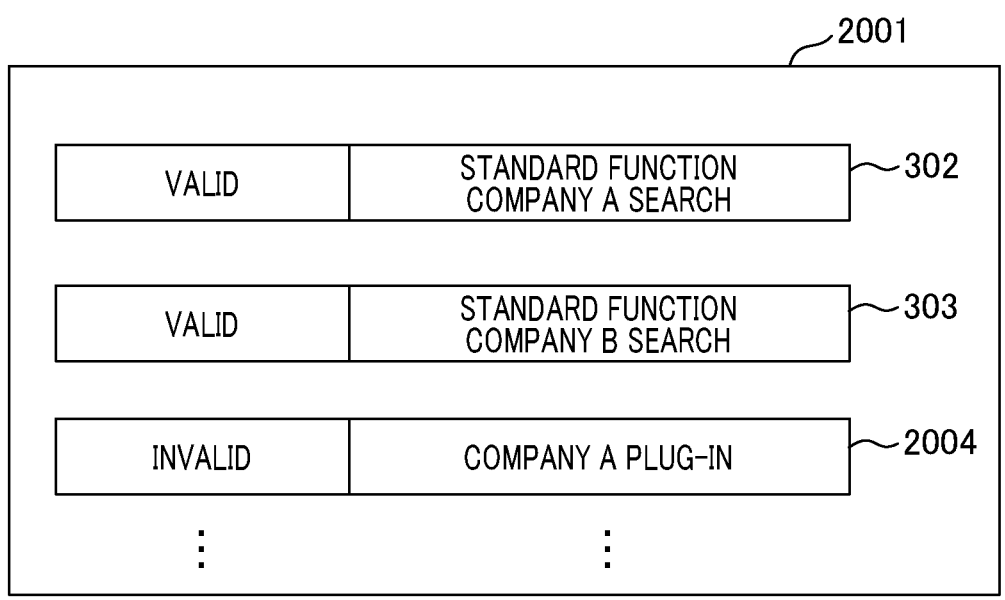
FIG. 18 is a diagram showing an example of data referred to in a search process by a printing system.

FIG. 18 is a diagram showing the search means flag data changed by the process of step S1904.

In detail, in the search means flag data 301 of FIG. 3, the Company A plug-in flag 304 was validated, but, by the process of step S1904, the Company A plug-in flag 304 was changed to a Company A plug-in flag 2004 that is invalidated. As a result, the process of step S403 of the search process by the printing system 203 is not performed.

Figure 19:
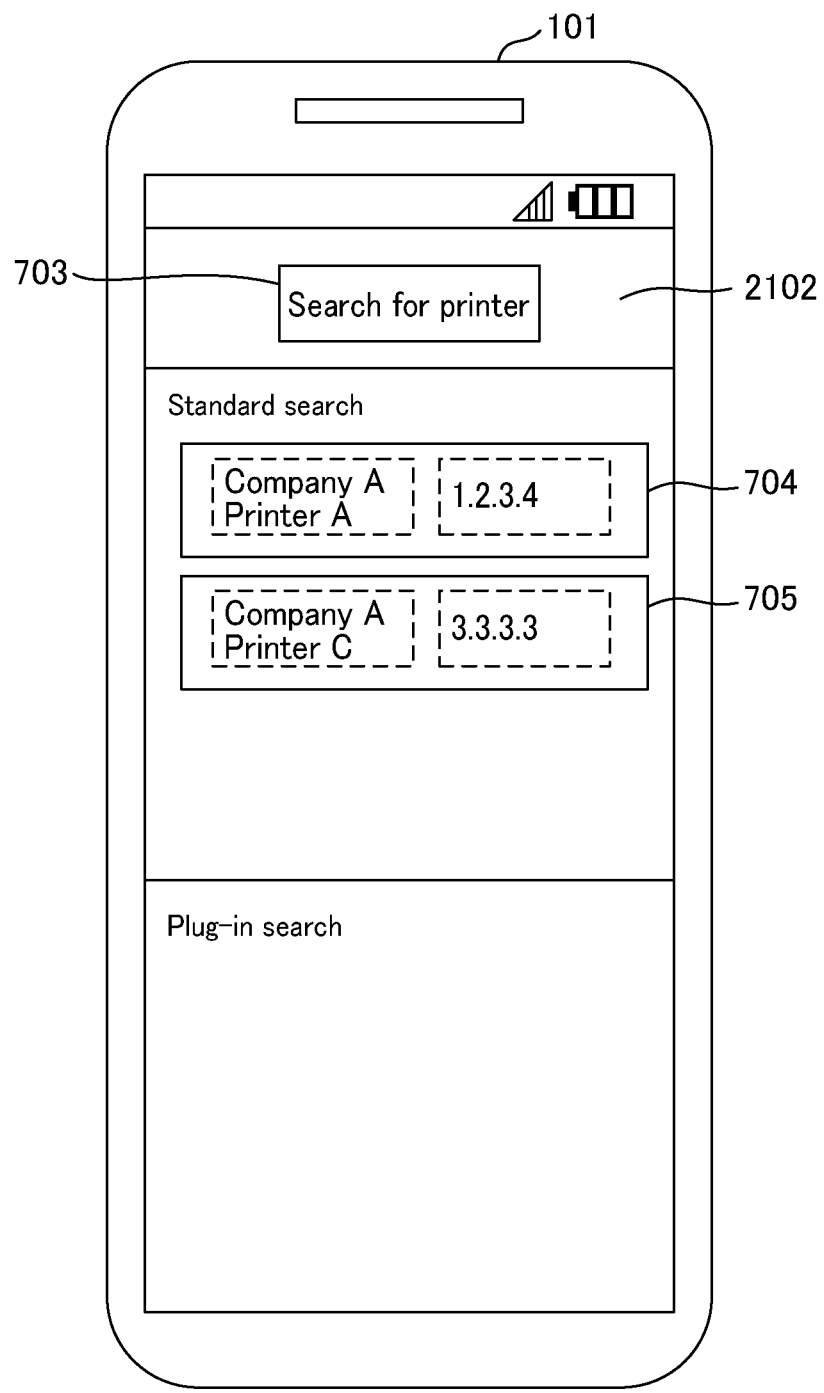
FIG. 19 is a diagram showing an example of a screen displaying a result of a search process by a printing system.

FIG. 19 is a diagram showing an example of a screen displaying a result of the search process (FIG. 4) performed by the printing system 203 of the mobile terminal 101.

In detail, a search screen 2102 is a screen displayed when the process shown in FIG. 15 is performed instead of the processes shown in FIG. 5, FIG. 8, and FIG. 12 in the search process (step S401) by the standard function of the search process (FIG. 4). Here, the same reference numerals in step S401 are given to the same components of the search screen 702 (FIG. 7) displayed when the process shown in FIG. 5 is performed, and description thereof will be omitted.

The search screen 2102 is different from the search screen 702 of FIG. 7 in that the search result printers 707 and 708 are not displayed on the search screen 2102. In other words, the printer that is detected both in the search process by the standard function and the search process by the plug-in and redundantly displayed in the search screen 702 (FIG. 7) is only displayed as a result of a search process by the standard function on the search screen 2102 (FIG. 19).

The reason thereof is, according to the process of step S1904 of FIG. 17, when all of printers detected in a search process by a plug-in are also detected in a search process by the standard function, the corresponding plug-in is invalidated.

As described above, according to the present embodiment, when a printer is searched for by using a printing system provided in the OS of an information processing apparatus and a plug-in for the corresponding printing system 203, it is possible to prevent a same printer from being redundantly displayed as a search result.

Fourth Embodiment

In the present embodiment, as in the third embodiment, when a printer detected in a search process by a plug-in is detected in a search process by a standard function of the printing system 203, a plug-in is invalidated, thereby preventing a same printer from being redundantly displayed. The same components as those of the first to third embodiments are denoted by the same reference numerals, and descriptions thereof are omitted. The process performed in the present embodiment is implemented by loading a program stored in the ROM 104 into the RAM 105 and executing the program by the CPU 103.

In the present embodiment, similarly to the third embodiment, the process shown in FIG. 15 is performed by the printing system 203 in step S401 of the search process (FIG. 4). Here, in the third embodiment, the process shown in FIG. 17 has been performed as a part of the process in step S1704 in FIG. 15. However, in the present embodiment, the process shown in FIG. 20 is performed instead of the process shown in FIG. 17.

Figure 20:
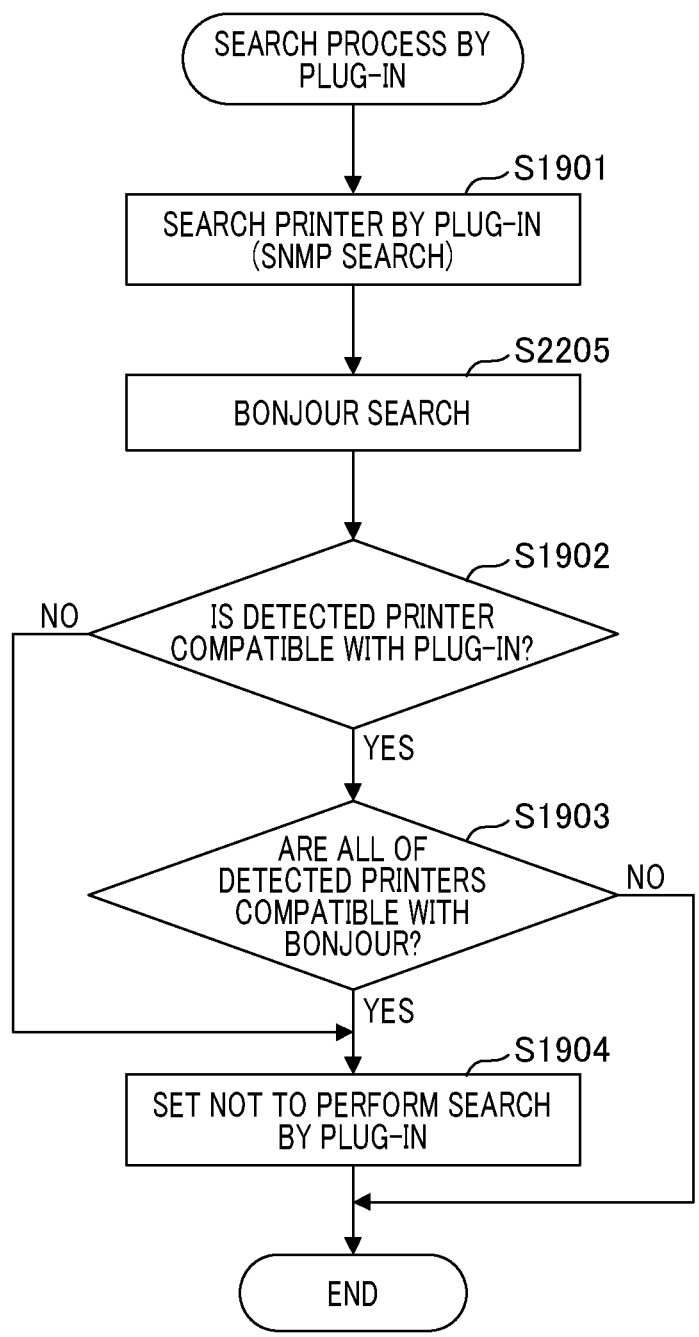
FIG. 20 is a diagram showing a search process by a plug-in for a printing system.

FIG. 20 is a flowchart for describing the details of the a process performed in step S1704 of FIG. 15.

In FIG. 20, the same steps as those in FIG. 17 are denoted by the same reference numerals, and descriptions thereof are omitted. In FIG. 20, in addition to the process of FIG. 17, the process of step S2205 is performed. In step S2205, the printer search unit 210 of the Company A plug-in 209 performs a printer searching by using the Bonjour.

In other words, in the present embodiment, in addition to a printer search using the SNMP, a printer search using the Bonjour is also performed. As a result, a printer that is a printer of a vendor that has created the Company A plug-in 209 (that is, the Company A), is not compatible with the SNMP, and is compatible with the Bonjour can be detected. By more comprehensively detecting a printer as compared to the third embodiment and performing step S1904, unnecessary performance of a plug-in can be suppressed.

In the present embodiment, a screen displayed according to a result of the search process (FIG. 4) performed by the printing system 203 is identical to the search screen 2102 shown in FIG. 19 of the third embodiment. Instead of the process shown in FIG. 17 performed in the third embodiment, the process shown in FIG. 20 is performed in the present embodiment, but a screen displayed according to a result of the search process shown in FIG. 20 is identical to that displayed according to a result of the search process shown in FIG. 17.

In other words, the printer that is redundantly displayed as results of both the search process by the standard function and the search process by the plug-in in the search screen 2102 (FIG. 19) is displayed only as a result of the search process by the standard function in the search screen 2102 (FIG. 19). The reason thereof is, when all of printers detected in a search process by a plug-in are also detected in a search process by the standard function, the corresponding plug-in is invalidated.

In the present embodiment, for example, even when there is only a printer that is compatible with the Bonjour and is not compatible with SNMP, duplicated displaying of the printer can be suppressed when the printer is detected both in a search process by a standard function and a search process by a plug-in.

As described above, according to the present embodiment, when a printer is searched for by using a printing system provided in an OS of an information processing apparatus and a plug-in for the corresponding printing system 203, it is possible to prevent a same printer from being redundantly displayed as a search result.

Fifth Embodiment

In the first to fourth embodiments, search processes performed by the printing system 203 have been described. In the present embodiment, a manipulation to be performed on a screen displayed according to a result of the corresponding search process and a screen to be displayed thereafter will be described. Furthermore, in the first to fourth embodiments, when a printer detected in the search process by the standard function of the printing system 203 is identical to a printer detected in a search process by a plug-in, which result to display is automatically determined.

On the other hand, in the present embodiment, a description will be given of a case where manually switching the results to be displayed. A process performed in present embodiment is implemented by loading a program stored in the ROM 104 into the RAM 105 and executing the program by the CPU 103.

FIG. 21 is an example of a screen on which print settings are made on the mobile terminal 101.

A print setting screen 2401 is displayed when a printer is selected on a search screen (as in FIG. 11 and others) displayed according to a result of a search process by the printing system 203 in each of the above-described embodiments. The selected printer is displayed on a selected printer 2402.

In a basic print setting 2403, the number of copies, a paper size, and double-sided/one sided can be set. An "Other Print Settings" button 2404 is a button for displaying a screen for setting parameters not included in the basic print setting 2403. However, the print setting screen 2401 shown in FIG. 21 is merely an example, and the present invention is not limited thereto. The print setting screen 2401 may vary depending on selected printers or plug-ins being used.

Figure 22:
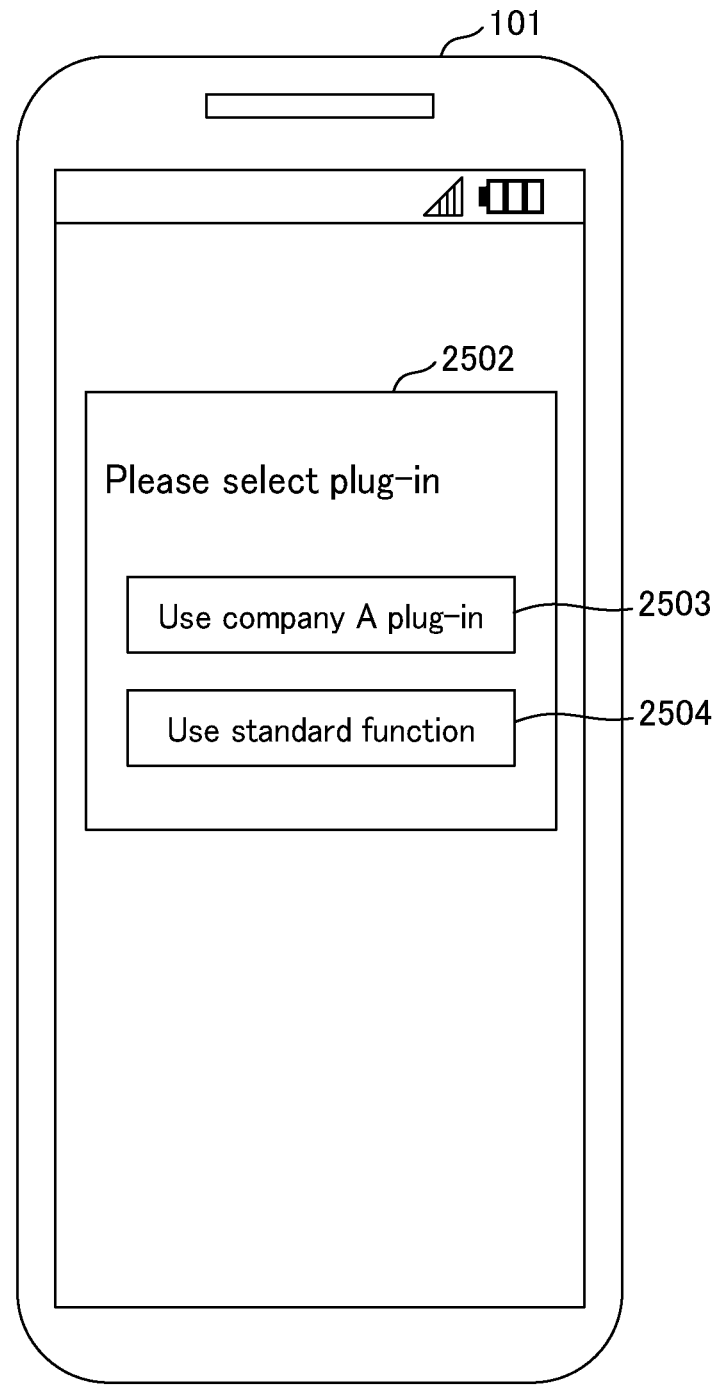
FIG. 22 is a diagram showing an example of a screen for selecting a search function by a printing system.

FIG. 22 is a diagram showing an example of a screen for selecting a search function by the printing system 203 on the mobile terminal 101.

In detail, a selection dialog 2502 is a screen for validating or invalidating the search function of the printing system 203 or the search function by the plug-in.

In the example shown in FIG. 22, the selection dialog 2502 includes a button 2503 for setting whether to use a plug-in provided by the Company A and a button 2504 for setting whether to use the standard function. A user can select either the button 2503 or the button 2504 to set whether to use a search function by the standard function of the printing system 203 or to use a search function by the plug-in.

Other Embodiments

Embodiment(s) of the present invention can also be realized by a computer of a system or apparatus that reads out and executes computer performable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and performing the computer performable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and perform the computer performable instructions. The computer performable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-57723, filed Mar. 23, 2017, which is hereby incorporated by reference wherein in its entirety.

What is claimed is:

1. An information processing apparatus that executes an operating system (OS) including a printing system that supports a search function using a first search protocol as a standard, the information processing apparatus comprising:
a memory storing instructions; and
a processor executing the instructions causing the information processing apparatus to:
identify, if a plug-in for the printing system is installed, a vendor that corresponds to the plug-in;
perform a search using the first search protocol;
perform a display conforming to a search result of one or more printers found by using the first search protocol, in which a printer of the identified vendor is excluded;
perform a search using a second search protocol by the plug-in for the printing system; and
perform, together with the display, a display conforming to a search result using the second search protocol, which includes the printer of the identified vendor.

2. The information processing apparatus according to claim 1, wherein the instructions further cause the information processing apparatus to:
display the search result of one or more printers found by using the first search protocol, in which the printer of the identified vendor is excluded, as a search result using a search function supported as a standard; and
display the search result of a printer found by using the second search protocol, which includes the printer of the identified vendor, as a search result using a search function by the plug-in.

3. The information processing apparatus according to claim 1, wherein the instructions further cause the information processing apparatus to display a screen for selecting either the search result using the search function supported as a standard or the search result using the search function by the plug-in to display.

4. An information processing apparatus that executes an operating system (OS) including a printing system that supports a search function using a first search protocol as a standard, the information processing apparatus comprising:
a memory storing instructions; and
a processor executing the instructions causing the information processing apparatus to:
perform a search using the first search protocol according to a script;
perform a search using a second search protocol by a plug-in for the printing system; and
perform a display conforming to a search result of one or more printers found according to the script, in which a predetermined printer is excluded, and a search result using the second search protocol, which includes the predetermined printer.

5. The information processing apparatus according to claim 4, wherein the instructions further cause the information processing apparatus to:
display, in the display, the search result of one or more printers found according to the script, in which the predetermined printer is excluded, as a search result using a search function supported as a standard; and
display, in the display, the search result using the second search protocol, which includes the predetermined printer as a search result using a search function by the plug-in.

6. The information processing apparatus according to claim 4, wherein the predetermined printer is a printer of a vendor that corresponds to the plug-in.

7. The information processing apparatus according to claim 4, wherein searches using one or more search protocols are performed according to the script.

8. The information processing apparatus according to claim 4, wherein whether or not to display a printer detected by using the search function supported as a standard is switched according to the script.

9. An information processing apparatus that executes an operating system (OS) including a printing system that supports a search function using a first search protocol as a standard, the information processing apparatus comprising:
a memory storing instructions; and
a processor executing the instructions causing the information processing apparatus to:
perform a search using the first search protocol;
perform a search using a second search protocol by a plug-in for the printing system;
perform, if the search using the second search protocol is performed according to a script for extending the search function supported by the printing system and if a search result of a printer found by using the second search protocol is included in a search result of a printer found by using the first search protocol, a display conforming to the search result of one or more printers found by using the first search protocol; and perform a display conforming to the search result of a printer found by using the second search protocol together with the search result of one or more printers found by using the first search protocol if the search using the second search protocol is performed according to the script and if a printer that is not included in the search result of a printer found by using the first search protocol exists among the search result of a printer found by using the second search protocol.

10. The information processing apparatus according to claim 9,
wherein, a re-search using the second search protocol is performed if the search using the second search protocol is performed according to the script and if a printer that is not included in the search result of a printer found by using the first search protocol exists among the search result of a printer found by using the second search protocol, and
wherein the instructions further cause the information processing apparatus to perform, in the display, a display conforming to a search result of a printer re-found by using the second search protocol together with the search result of one or more printers found by using the first search protocol.

11. The information processing apparatus according to claim 9, wherein the instructions further cause the information processing apparatus to:
perform a search using the first search protocol by the plug-in; and
perform a display conforming to the search result of a printer found by using the first search protocol if the search using the first search protocol by the plug-in and the search using the second search protocol are performed according to the script and if a search result of a printer using the first search protocol by the plug-in and the second search protocol is included in a search result of a printer using the first search protocol.

12. The information processing apparatus according to claim 9, wherein the instructions further cause the information processing apparatus to:
display the search result of one or more printers found by using the first search protocol as a search result using a search function supported as a standard; and
display the search result of one or more printers found by using the second search protocol by the plug-in for the printing system as a search result using a search function by the plug-in.

13. A method for controlling an information processing apparatus that executes an operating system (OS) including a printing system that supports a search function using a first search protocol as a standard, the method comprising:
identifying, if a plug-in for the printing system is installed, a vendor that corresponds to the plug-in;
performing a search using the first search protocol; and
performing, if a search using a second search protocol is performed by the plug-in for the printing system, together with a first display conforming to a search result of one or more printers found by using the first search protocol, in which a printer of the identified vendor is excluded, a second display conforming to a search result using the second search protocol, which includes the printer of the identified vendor.

14. A method for controlling an information processing apparatus that executes an operating system (OS) including a printing system that supports a search function using a first search protocol as a standard, the method comprising:
performing a search using the first search protocol according to a script for acquiring a search result, in which a predetermined printer is excluded; and
performing, if a search using a second search protocol by a plug-in for the printing system is performed, a display conforming to a search result of one or more printers found according to the script, in which the predetermined printer is excluded, and a search result using the second search protocol, which includes the predetermined printer.

15. The method according to claim 14, wherein the predetermined printer is a printer of a vendor that corresponds to the plug-in.

16. The method according to claim 14, wherein whether or not to display a printer detected by using the search function supported as a standard is switched according to the script.

17. A non-transitory storage medium storing a computer program for making a computer perform:
identifying, if a plug-in for a printing system that is included in an operating system (OS) and supports a search function using a first search protocol as a standard is installed, a vendor that corresponds to the plug-in;
searching using the first search protocol; and
if a search using a second search protocol is performed by the plug-in for the printing system, together with a first display conforming to a search result of one or more printers found by using the first search protocol, a second display conforming to a search result using the second search protocol, which includes the printer of the identified vendor in which a printer of the identified vendor is excluded.

18. A non-transitory storage medium storing a computer program for making a computer perform:
searching using a first search protocol that is supported by a printing system included in an operating system (OS) as a standard for acquiring a search result, in which a predetermined printer is excluded; and
if a search using a second search protocol by a plug-in for the printing system is performed, a display conforming to a search result using the first search protocol, in which the predetermined printer is excluded, and a search result using the second search protocol, which includes the predetermined printer.

19. The non-transitory storage medium according to claim 18, wherein the predetermined printer is a printer of a vendor that corresponds to the plug-in.

20. The non-transitory storage medium according to claim 18, wherein whether or not to display a printer detected by using the search function supported as a standard is switched according to the script.

* * * * *